United States Patent
Brown et al.

(10) Patent No.: US 9,785,450 B2
(45) Date of Patent: *Oct. 10, 2017

(54) TRIGGERED CONTROLLED EVENT LISTENER LEARNER

(71) Applicant: International Business Machines Corporation, Armonk, NY (US)

(72) Inventors: William A. Brown, Raleigh, NC (US); Francis X. Reddington, Sarasota, FL (US); Neil Sahota, Costa Mesa, CA (US); Martin A. Wolfe, Mooresville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,760

(22) Filed: May 25, 2016

(65) Prior Publication Data

US 2016/0350140 A1 Dec. 1, 2016

Related U.S. Application Data

(63) Continuation of application No. 14/084,685, filed on Nov. 20, 2013, now Pat. No. 9,417,893.

(51) Int. Cl.
*G06F 11/14* (2006.01)
*G06F 9/54* (2006.01)
(Continued)

(52) U.S. Cl.
CPC ............ *G06F 9/44505* (2013.01); *G06F 9/54* (2013.01); *G06F 9/542* (2013.01); *G06N 5/025* (2013.01);
(Continued)

(58) Field of Classification Search
CPC ............. G06F 11/1417; G06F 11/1456; G06F 11/1458; G06F 11/1461; G06F 11/1469;
(Continued)

(56) References Cited

U.S. PATENT DOCUMENTS

| 7,188,368 B2 | 3/2007 | Swimmer et al. |
| 7,392,543 B2 | 6/2008 | Szor |

(Continued)

FOREIGN PATENT DOCUMENTS

| CN | 102436560 A | 5/2012 |
| CN | 102592093 A | 7/2012 |
| KR | 101039909 B1 | 6/2011 |

OTHER PUBLICATIONS

Morton Swimmer, "Using the danger model of immune systems for distributed defense in modern data networks", ScienceDirect, Computer Networks 51, 2007, pp. 1315-1333.

(Continued)

*Primary Examiner* — Michael J Brown
(74) *Attorney, Agent, or Firm* — Maeve M. Carpenter; Hunter E. Webb; Keohane & D'Alessandro PLLC

(57) ABSTRACT

Aspects of the present invention provide a solution for responding to a change in an environment of a computer system. In an embodiment, a set of triggered controlled event listener learners (T-CELLs) are deployed in the computer system. Each T-CELL of the set of T-CELLs is a self-contained, persistent software construct. Further, each T-CELL has the ability to communicate with the other T-CELLs in the computer system. These T-CELLs can, in response to detecting a change in the computer system, automatically create a new T-CELL to respond to the change.

20 Claims, 10 Drawing Sheets

(51) Int. Cl.
  *G06F 9/445* (2006.01)
  *G06N 5/02* (2006.01)
  *G05B 23/02* (2006.01)

(52) U.S. Cl.
  CPC ...... *G05B 23/0283* (2013.01); *G06F 11/1417* (2013.01); *G06F 11/1448* (2013.01); *G06F 11/1456* (2013.01); *G06F 11/1458* (2013.01); *G06F 11/1461* (2013.01); *G06F 11/1469* (2013.01)

(58) Field of Classification Search
  CPC ............ G06F 11/1448; G06F 11/0793; G06F 11/1438; G06F 11/2012; G06F 8/65; G06F 9/445; G05B 23/0283
  USPC ................................................ 713/1, 2, 100
  See application file for complete search history.

(56) References Cited

U.S. PATENT DOCUMENTS

| | | |
|---|---|---|
| 7,512,809 B2 | 3/2009 | Peikari |
| 7,725,937 B1 | 5/2010 | Levy |
| 7,774,845 B2 | 8/2010 | Shipman |
| 9,417,893 B2 * | 8/2016 | Brown ................ G06F 9/44505 |
| 2002/0016928 A1 | 2/2002 | Takaragi et al. |
| 2002/0178374 A1 | 11/2002 | Swimmer et al. |
| 2005/0022014 A1 | 1/2005 | Shipman |
| 2005/0204150 A1 | 9/2005 | Peikari |
| 2013/0097709 A1 | 4/2013 | Basavapatna et al. |
| 2014/0115703 A1 | 4/2014 | Penton et al. |
| 2015/0143100 A1 | 5/2015 | Brown et al. |

OTHER PUBLICATIONS

Tao Stein et al., "Facebook Immune System", EuroSys Social Network Systems (SNS) 2011, Apr. 10, 2011, Salzburg, 8 pages.
"Biological Inspiration for Computing", A popularized account of biological inspiration for computing is N. Forbes, Imitation of Life: How Biology Is Inspiring Computing, MIT Press, Cambridge, MA., 2004, pp. 247-298.
Michael J. Brown, USPTO Office Action, U.S. Appl. No. 14/084,685, Notification Date Jan. 12, 2016, 12 pages.
Michael J. Brown, USPTO Notice of Allowance, U.S. Appl. No. 14/084,685, Date Mailed May 5, 2016, 10 pages.

* cited by examiner

TRIGGERED CONTROLLED EVENT LISTENER LEARNER

RELATED U.S. APPLICATION DATA

The present patent document is a continuation of U.S. patent application Ser. No. 14/084,685, filed Nov. 20, 2013, entitled "TRIGGERED CONTROLLED EVENT LISTENER LEARNER", the entire contents of which is incorporated herein by reference.

TECHNICAL FIELD

The subject matter of this invention relates generally to computer environment management. More specifically, aspects of the present invention provide a solution for responding to a change in the environment of a computer system.

BACKGROUND

As information technology has developed, the uses to which it has been put have increased dramatically. In the past, simple solutions were created to deal with discrete problems. Now, computer systems are often highly complex, using a large assortment of processes, events, rules, and/or measurements to provide solutions regarding a host of problems and/or entire problem classes.

One of the challenges in these current, highly complex computing systems is how to respond to problems that may not have been previously encountered. For example, when changes need to be made to such a complex computing system, it can often take much time and/or consideration to determine how these changes are to be introduced. Further, changes to such a computing system must be performed in such a manner that the remainder of the system is not adversely affected.

SUMMARY

In general, aspects of the present invention provide a solution for responding to a change in an environment of a computer system. In an embodiment, a set of triggered controlled event listener learners (T-CELLs) are deployed in the computer system. Each T-CELL of the set of T-CELLs is a self-contained, persistent software construct. Further, each T-CELL has the ability to communicate with the other T-CELLs in the computer system. These T-CELLs can, in response to detecting a change in the computer system, automatically create a new T-CELL to respond to the change.

A first aspect of the invention provides a method for responding to a change in an environment of a computer system, comprising: detecting a change within the computer system with a set of triggered controlled event listener learners (T-CELLs), each T-CELL of the set of T-CELLs being a self-contained, persistent software construct that communicates with other T-CELLs in the computer system; assessing a nature of the change using the set of T-CELLs; identifying a characteristic having at least of portion of the nature of the change; and automatically creating a new T-CELL having the characteristic using characteristics from a plurality of T-CELLs to respond to the change.

A second aspect of the invention provides a system for responding to a change in an environment of a computer system, comprising: a memory medium comprising instructions; a bus coupled to the memory medium; a processor coupled to the bus; and a set of trigger controlled event listener learners (T-CELLs), each T-CELL of the set of T-CELLs being a self-contained, persistent software construct that communicates with other T-CELLs in the computer system and having: a set of processes, a set of rules, a set of events, and a set of measurements that form building blocks of the T-CELL; a set of constraint, a set of triggers, a set of thresholds, a set of status/states, a set of conditions, a set of responses, and a set of key performance indicators (kpis) formed from the building blocks; a set of contextual references that define a context in which the T-CELL functions; and a set of the characteristics that define a problem set that can be solved by the T-CELL, wherein, in response to a detecting of a change in the computer system, the set of T-CELLs automatically create a new T-CELL to respond to the change.

A third aspect of the invention provides a computer program product embodied in a computer readable medium for responding to a change in an environment of a computer system, comprising: a set of trigger controlled event listener learners (T-CELLs), each T-CELL of the set of T-CELLs being a self-contained, persistent software construct that communicates with other T-CELLs in the computer system and having: a set of processes, a set of rules, a set of events, and a set of measurements that form building blocks of the T-CELL; a set of constraint, a set of triggers, a set of thresholds, a set of status/states, a set of conditions, a set of responses, and a set of key performance indicators (kpis) formed from the building blocks; a set of contextual references that define a context in which the T-CELL functions; and a set of the characteristics that define a problem set that can be solved by the T-CELL, wherein, in response to a detecting of a change in the computer system, the set of T-CELLs automatically create a new T-CELL to respond to the change.

A fourth aspect of the present invention provides a method for deploying an application for responding to a change in an environment, comprising: providing a computer infrastructure being operable to: detect a change within the computer system with a set of triggered controlled event listener learners (T-CELLs), each T-CELL of the set of T-CELLs being a self-contained, persistent software construct that communicates with other T-CELLs in the computer system; assess a nature of the change using the set of T-CELLs; identify a characteristic having at least of portion of the nature of the change; and automatically create a new T-CELL having the characteristic using characteristics from a plurality of T-CELLs to respond to the change.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
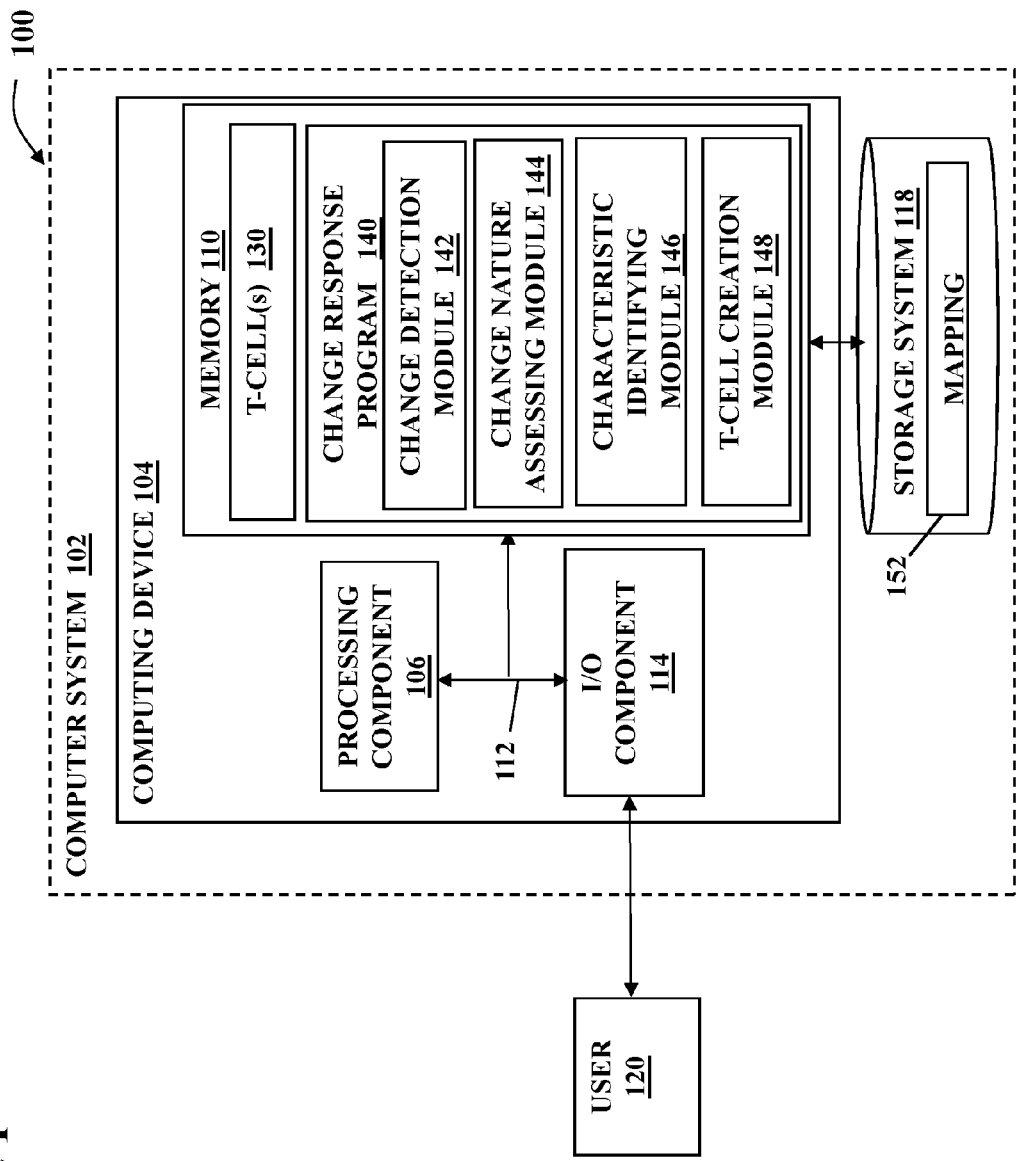
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide a solution for responding to a change in an environment of a computer system. In an embodiment, a set of triggered controlled event listener learners (T-CELLs) are deployed in the computer system. Each T-CELL of the set of T-CELLs is a self-contained, persistent software construct. Further, each T-CELL has the ability to communicate with the other T-CELLs in the computer system. These T-CELLs can, in response to detecting a change in the computer system, automatically create a new T-CELL to respond to the change.

Turning to the drawings, FIG. 1 shows an illustrative environment 100 for responding to a change in an environment. To this extent, environment 100 includes a computer system 102 that can perform a process described herein in order to respond to a change in an environment. In particular, computer system 102 is shown including a computing device 104 that includes change response program 140, which makes computing device 104 operable to respond to a change in an environment by using a set of triggered controlled event listener learners (T-CELLs) 200 to perform all or a portion of a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as change response program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, change response program 140 can manage a set of interfaces (e.g., graphical user interface(s), application program interface, and/or the like) that enable human and/or system users 120 to interact with change response program 140. Users 120 could include application developers, application testers, application end-users, and/or system administrators who want to respond to a change in an environment of a computer system (e.g., one or more of a plurality of virtual servers), among others. Further, change response program 140 can manage (e.g., store, retrieve, create, manipulate, organize, present, etc.) the data in storage system 118, including, but not limited to a mapping 152 and/or the like, using any solution.

In any event, computer system 102 can comprise one or more computing devices 104 (e.g., general purpose computing articles of manufacture) capable of executing program code, such as change response program 140, installed thereon. As used herein, it is understood that "program code" means any collection of instructions, in any language, code, or notation, that causes a computing device having an information processing capability to perform a particular action either directly or after any combination of the following: (a) conversion to another language, code, or notation; (b) reproduction in a different material form; and/or (c) decompression. To this extent, change response program 140 can be embodied as any combination of system software and/or application software. In any event, the technical effect of computer system 102 is to provide processing instructions to computing device 104 in order to respond to a change in an environment.

Further, change response program 140 can be implemented using a set of modules 142-148. In this case, a module 142-148 can enable computer system 102 to perform a set of tasks used by change response program 140, and can be separately developed and/or implemented apart from other portions of change response program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104 (e.g., a client and one or more remotely located servers), each computing device 104 can have only a portion of change response program 140 fixed thereon (e.g., one or more modules 142-148). However, it is understood that computer system 102 and change response program 140 are only representative of various possible equivalent computer systems that may perform a process described herein. To this extent, in other embodiments, the functionality provided by computer system 102 and change response program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links, comprise any combination of one or more types of networks, and/or utilize any combination of various types of transmission techniques and protocols.

As discussed herein, change response program 140 enables computer system 102 to respond to a change in an environment. To this extent, change response program 140 is shown including a change detection module 142, a change nature assessing module 144, a characteristic identifying module 146, and a T-CELL creation module 148.

Figure 2:
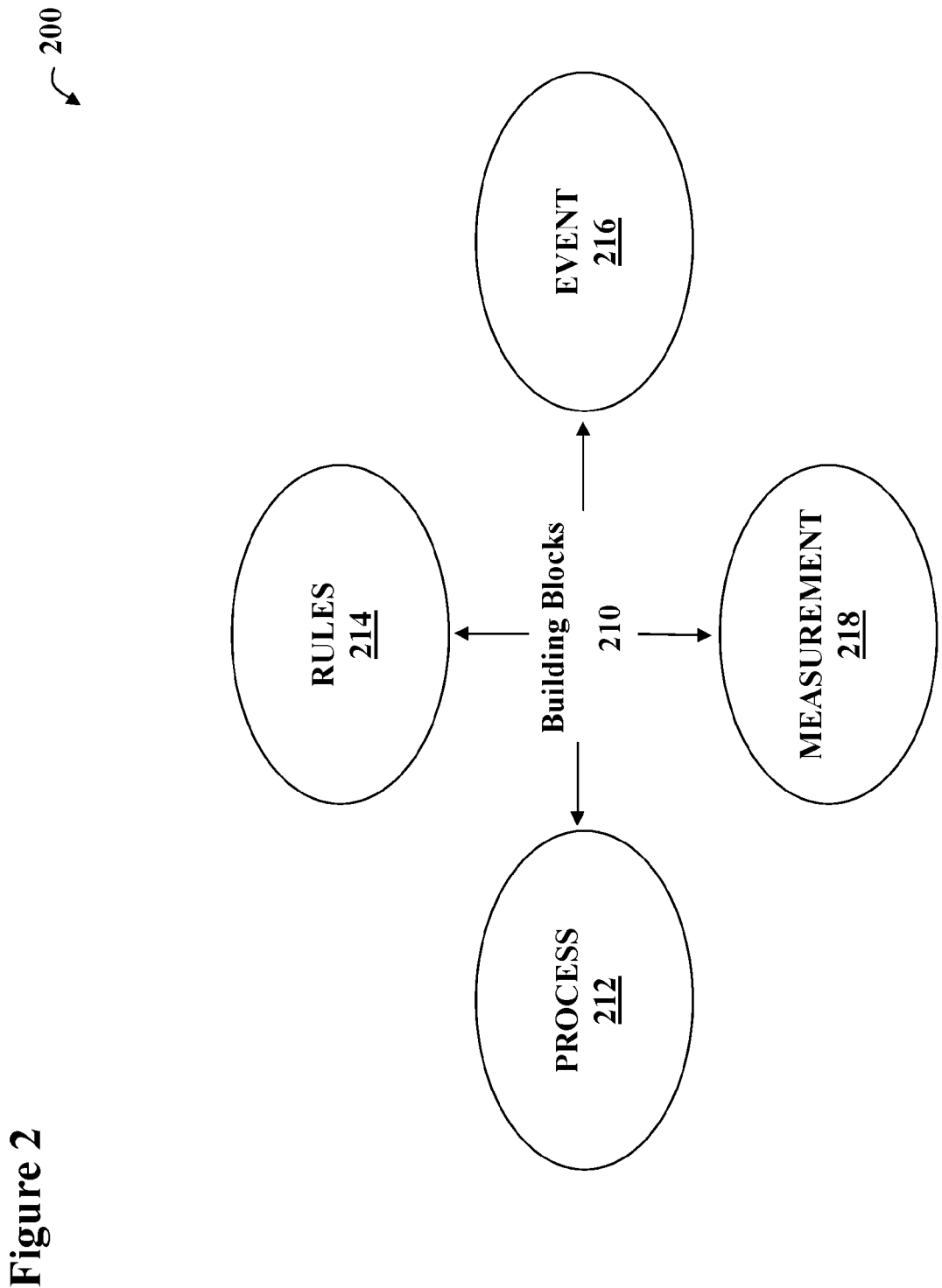
FIG. 2 shows a set of building blocks according to embodiments of the invention.
Figure 3:
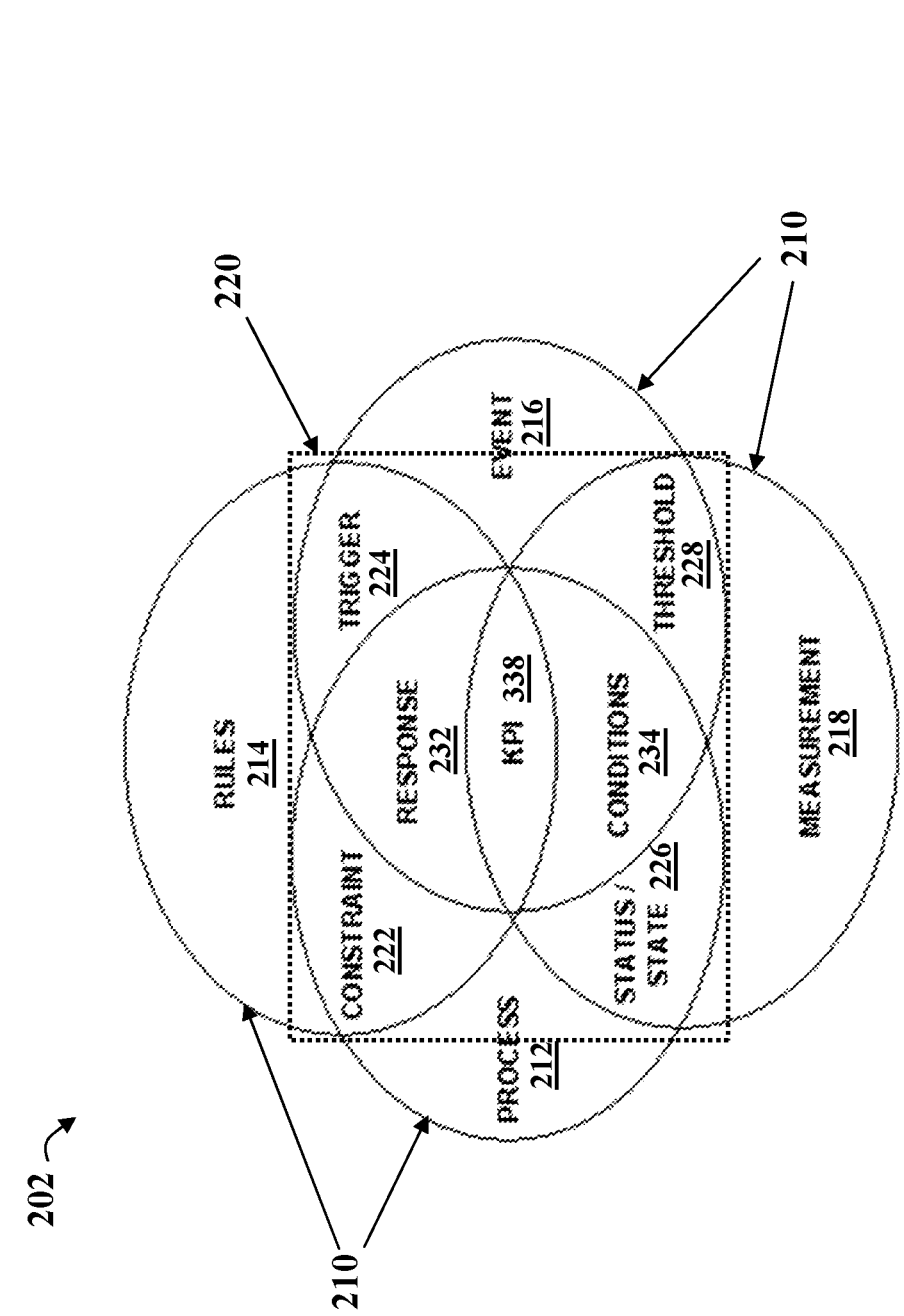
FIG. 3 shows an example T-CELL according to embodiments of the invention.
Figure 4:
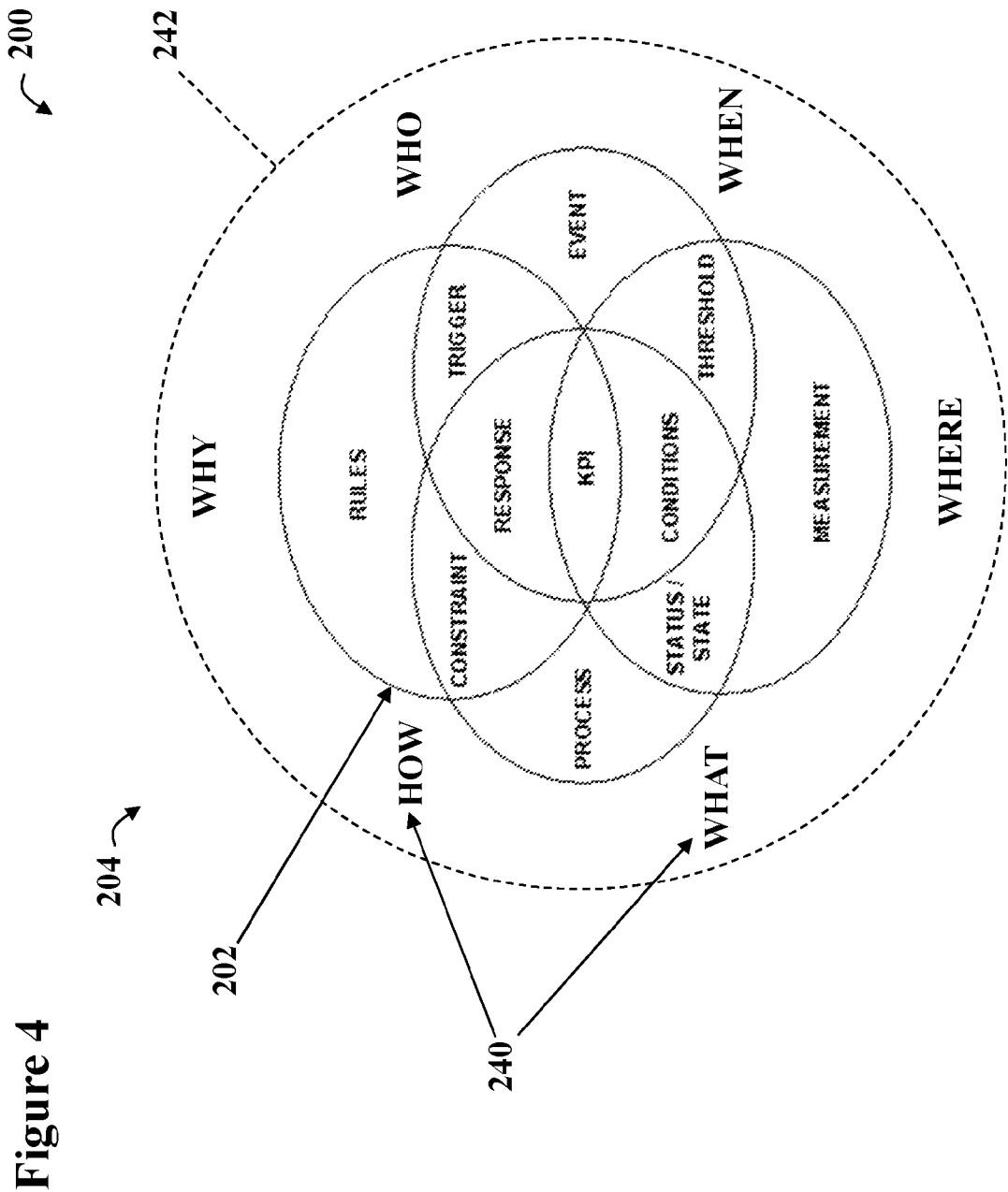
FIG. 4 shows an example T-CELL according to embodiments of the invention.

Referring now to FIGS. 2-4, characteristics of an example T-CELL 200 will be described according to embodiments of the invention. It should be understood that the discussion included herein is only representative of one set of characteristics and/or functions of T-CELL(s) 200. As such, the discussion included herein should not be taken as limiting. Rather, other functions and/or characteristics of T-CELL(s) can be envisioned by those skilled in the art.

To this extent, T-CELL(s) 200 can be thought of as persistent, self-aware, self-replicating software objects/constructs that operate within a computing environment 100 (FIG. 1). The level within computing environment 100 (FIG. 1) in which T-CELL(s) 200 operate can vary depending on need. For example, in embodiments of the invention, T-CELL(s) 200 can include programming objects that operate within, but independently of, an application subsystem. Such an application subsystem can be of any size or complexity. However, being independent, T-CELL(s) 200 would execute within the framework of the application subsystem in performing functions that benefit the subsystem. In other embodiments, T-CELL(s) 200 can operate a similar manner within a middleware system, an operating system, and/or the like.

As such, in its simplest incarnation, T-CELL(s) 200 can be thought of as being analogous to a computer virus. For example, like a computer virus, T-CELL(s) operates within a computer environment, but is independent and not controlled by the computer environment. Further, T-CELL(s) 200 can self-replicate, similar to a computer virus. However, unlike a virus, T-CELL(s) 200 does not create an exact replica, as shall be demonstrated herein. Further, rather than performing malicious or destructive actions, like a virus, T-CELL(s) 200 works within the framework of the computer environment to enable the computer environment to perform its functions. Still further, unlike a computer virus, each T-CELL(s) 200 within the computer environment is aware of the existence and capabilities of other T-CELL(s) 200 within the environment, as shall be shown.

In any case, as illustrated in FIG. 2, each of T-CELL(s) 200 can be broken down into a set of building blocks 210. Building blocks 210 can be thought of as including the basic components that control the behavior of T-CELL(s) 200. To this extent, T-CELL(s) 200 can include a set of processes 212, a set of rules 214, a set of events 216, and a set of measurements 218. Processes 212 can include the instructions that govern the functional workings of T-CELL(s) 200. Rules 214 can include a set of parameters that can be defined to govern the functioning of processes 212. Events 216 can be defined as occurrences that can be internal or external to T-CELL(s) 200, and which can act, possibly in accordance with rules 214, as a trigger for the performing of processes 212. Measurements 218 can be observed and/or computed values that can be used by processes 212 in the performance of its functions, in analyzing an event 216, and or the like.

Referring now to FIG. 3, a nucleus 202 of T-CELL(s) 200 is shown according to an embodiment. As shown, nucleus 202 is represented functionally by the merging of building blocks 210 to form a Venn diagram. To this extent, the intersection of two or more building blocks 210 can result in a combined functionality region 220. For example, the intersection of building blocks 210 corresponding to process 212 and rules 214 can result in a constraint 222 of process 212 based on rules. Similarly, a status/state 226 can be the result of a process 212 that incorporates measurement 218. Further, rules 214 could be used to define a trigger 224 that arises from a particular event 216. Similarly, measurement 218 can be used to define a threshold 228 for reaching a particular event 216.

Combined functionality region 220 can also be formed from an intersection of more than two building blocks 210. For example, a combination of trigger 224 and constraint 222 can result in a response 232, which can be a process 212 performed in response to event 216 according to rules 214. Similarly, conditions 234 can result from the combination of a process 212 that applies a measurement 218 to an event 216. Finally, an intersection of all four building blocks 210 can result in a key performance indicator (kpi) 338, which can include a relative value with respect to a whole.

Referring now to FIG. 4, an example contextualized nucleus 204 of T-CELL(s) 200 according to embodiments of the invention is shown. As shown, contextualized nucleus 204 includes nucleus 202. In addition, nucleus 202 is shown as being surrounded by a nuclear membrane 242. Nuclear membrane 242 is a conceptual structure that is meant to differentiate the inner workings of the T-CELL 200 from its external interfaces. To this extent, within nuclear membrane 242 can be found one or more contextual references 240 that apply to the functions performed in the nucleus 202.

Contextual references 240 can indicate in what context the building blocks 210 (FIG. 2) and combined functionality regions 220 (FIG. 3) perform their relative functions. To this extent, contextual references 240 can include such contexts as "WHO" (a person, entity, group, etc. that the functions apply to), "WHAT" (what specifically is to be done), "HOW" (specific ways in which the functionality is carried out), "WHERE" (in what environment the functionality is to be exercised), "WHEN" (one or more times, elapsed times, periods of time, etc., during which the functionality is to be carried out), and/or "WHY" (one or more reasons, justifications, circumstances, etc., in response to which the functionality is to be carried out). To this extent, contextual references 240 can be drawn from the interactions between the information contained in the building blocks 210 of a particular nucleus 202 and their interactions. Additionally, or in the alternative, contextual references 240 can be added to nucleus 202 to act as a guide, restraint, etc., for the functionality of nucleus 202.

Figure 5:
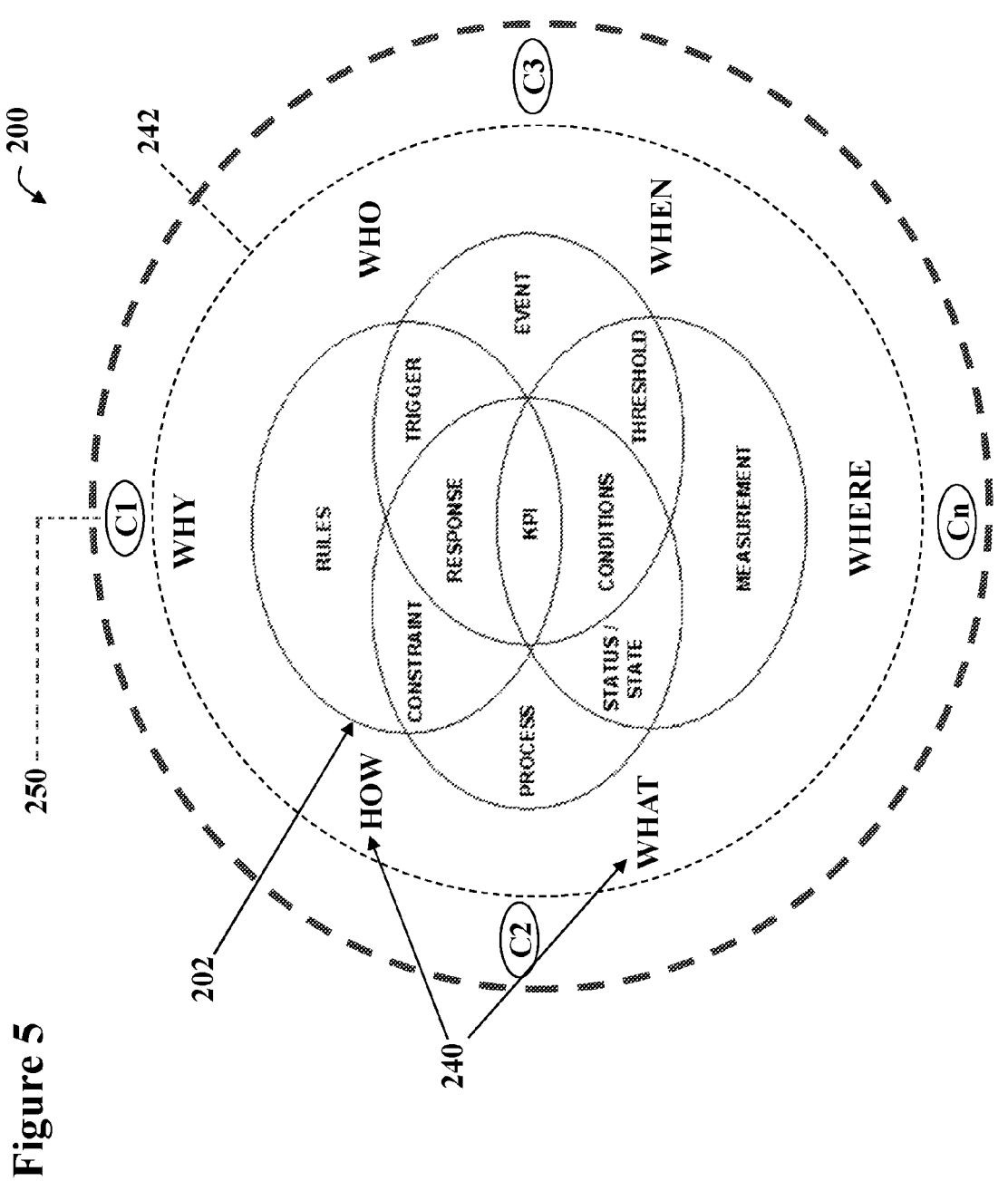
FIG. 5 shows an example T-CELL according to embodiments of the invention.

Referring now to FIG. 5, an example T-CELL 200 according to embodiments of the invention is shown. As illustrated T-CELL 200 includes nucleus 202 and contextual references 240 within nuclear membrane 242. Further, as illustrated, T-CELL 200 contains one or more characteristics 250 represented by C1-Cn. Characteristics 250 can be thought of as being an external display of the functionality of the T-CELL 200 (e.g., of the nucleus 202 as performed in the context of contextual references 240). To this extent, characteristics 250 can include one or more capabilities that describe the functionality of the T-CELL 200. Further, characteristics 250 can include one or more quality attributes. Quality attributes can provide insight into the qualities that the particular T-CELL 200 might possess for applying its capabilities, such as particular functionalities and/or contextual capabilities. Additionally, or in the alternative, quality attributes can indicate a particular service level within which the T-CELL 200 is designed to be used. To this extent, quality attributes can indicate, with respect to a particular T-CELL 200: availability, reliability, performance, scalability, maintainability, security, safety, integrity, modifiability, and/or the like.

Referring again to FIG. 5 in conjunction with FIG. 1, in any case, characteristics 250 can be used by T-CELL 200 to communicate and/or collaborate with one or more other T-CELLs in the environment. In this way, each T-CELL 200 can be aware of its environment and any other T-CELLs 200 located therein. This can be accomplished using a mapping 152 that includes information regarding each of the T-CELLs in the environment. Mapping 152 could include a data structure in a central environment that each T-CELL 200 can access. Additionally, or in the alternative, mapping 152 could be distributed across one or more locations in a computer network (e.g., a cloud network). Still further, all or a portion of mapping 152 can be located within the T-CELLs 200, themselves. In such a solution, each T-CELL 200 could contain all or a portion of the mapping 152 or, alternatively, certain T-CELLs 200, designated as master T-CELLs, could store and be used by other T-CELLs 200 to access the mapping 152. In any case, mapping 152 can contain a registration of each of T-CELLs 200 in the environment. In addition, mapping 152 can contain characteristics 250 of the registered T-CELL(s) 200. Additionally, or in the alternative, mapping 152 can include any relationships that the registered T-CELL 200 may have with any other T-CELL(s) 200 in the environment. These relationships can enable multiple T-CELL(s) to work together within the computing environment. Additionally, or in the alternative, the information stored in mapping 152 can enable multiple T-CELLs to respond to changes in the computing environment.

Returning again to FIG. 1, computer system 102, change detection module 142, detects a change within computer system 100. The change can include any alteration in the operating environment of the computer system. For example, in the event that the environment in which the T-CELL(s) 200 are operating includes a software application, the change could include a change in the inputs that are accepted by the application, a change in the outputs that are produced by the application, a change in the parameters that are used to perform the processing, a new process introduced into the environment, and/or the like. Similarly, in the case that the operating environment is that of an operating system or middle environment, any changes that are applicable to such an environment are envisioned.

Figure 6:
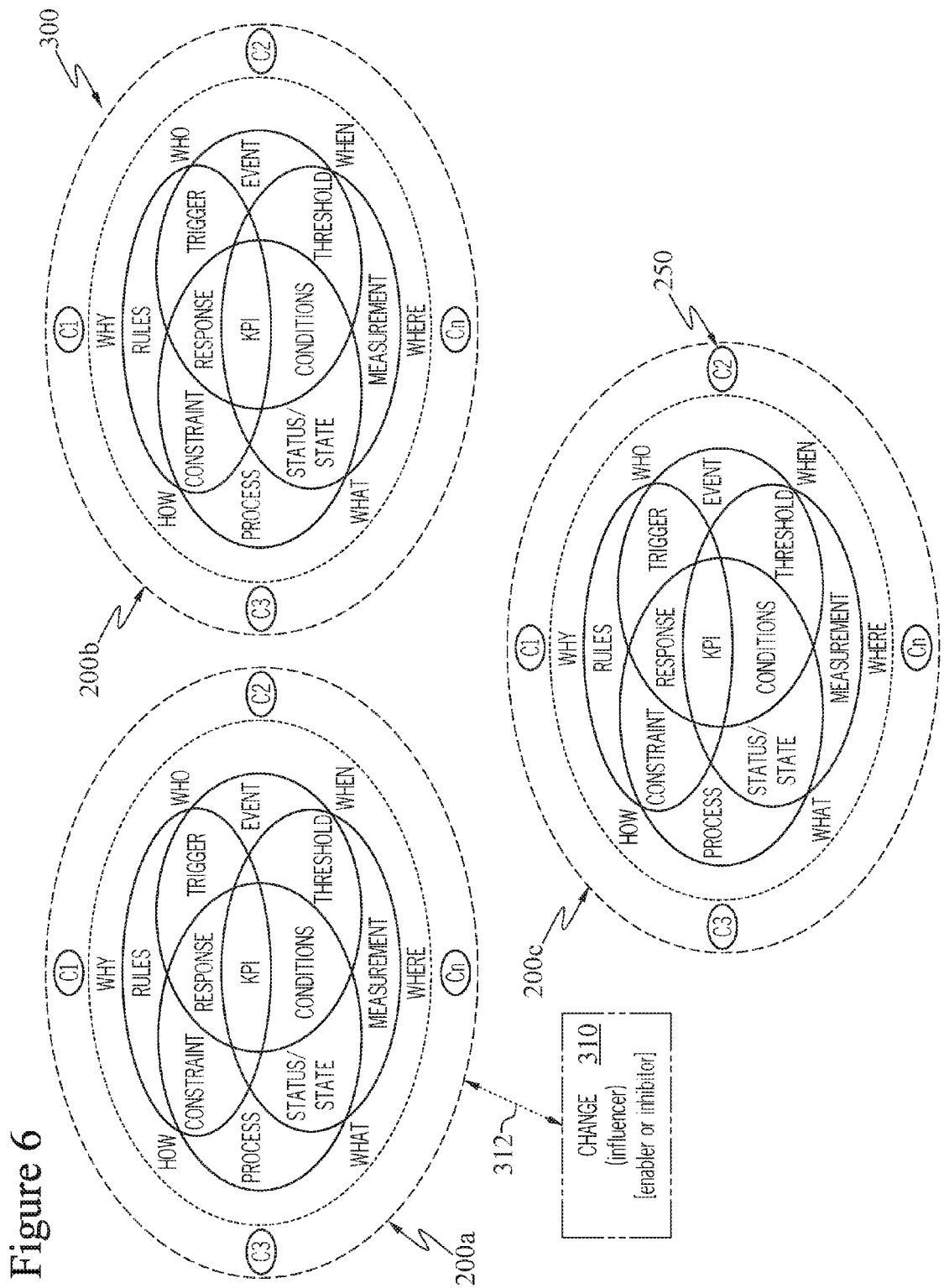
FIG. 6 shows an example environment having a plurality of T-CELLs according to embodiments of the invention.

Referring now to FIG. 6, in conjunction with FIGS. 1 and 5, an example environment 300 having a set of T-CELLs 200a-c according to embodiments of the invention is shown. Environment 300 can be any environment 300 in which T-CELL(s) 300 could be deployed, including, but not limited to, an application, middleware and/or operating system environment. In any event, a set of T-CELLs 200a-c are illustrated in environment 300. It should be understood that the illustrated number, orientation, and/or configuration of T-CELLs 200a-c in environment 300 should not be read as limiting. Rather, any number, orientation, and/or configuration of T-CELLs 200a-c is envisioned. In any case, as illustrated, each of T-CELLs 200a-c in environment 300 includes a nucleus 202, a set of contextual references 240, and a set of characteristics. Further, as illustrated, a change 310 has been introduced into environment 300. One or more of the set of T-CELLs 200a-c can detect 312 change 310. This detecting can be accomplished using a monitoring function within the T-CELL(s) 200a-c, an external real-time monitoring system that provides event-type notification to T-CELL(s), via the taking of a series of snapshots of environment 300, and/or using any other solution for detecting a change 310 in a computing environment 300.

Computer system 102, executing change nature assessing module 144, assesses a nature of change 310 using the set of T-CELLs 200a-c. To this extent, T-CELLs 200a-c can assess a change 310 that can be associated with the nature of the building blocks 210 in a particular T-CELLs 200a-c. Additionally or in the alternative, T-CELLs 200a-c could assess that the change 310 is a nature of affecting existing desired outcomes associated with building blocks 210. Still further, T-CELLs 200a-c could additionally, or alternatively, determine that the change 310 involves which meta-objects in environment 300 (e.g., in a domain in computer system 102) are affected by change 310 to building blocks 210.

Referring again to FIG. 1 in conjunction with FIGS. 5 and 6, computer system 102, executing characteristic identifying module 146, identifies a characteristic 250 having at least of portion of the nature of the change. This identifying can be based on the assessment performed by change nature assessing module 144. For example, based on the assessment, T-CELLs 200a-c can determine which of the building blocks 210 that make up the T-CELLs 200a-c would be necessary to achieve a desired outcome. T-CELLs 200a-c can further determine which of the contextual references is necessary to achieve the desired outcome. Based on these determinations (e.g., of the necessary building blocks 210 and contextual references 240), a set of characteristics 250 necessary to address the change in such a way as to achieve the desired outcome can be identified.

Figure 7A:
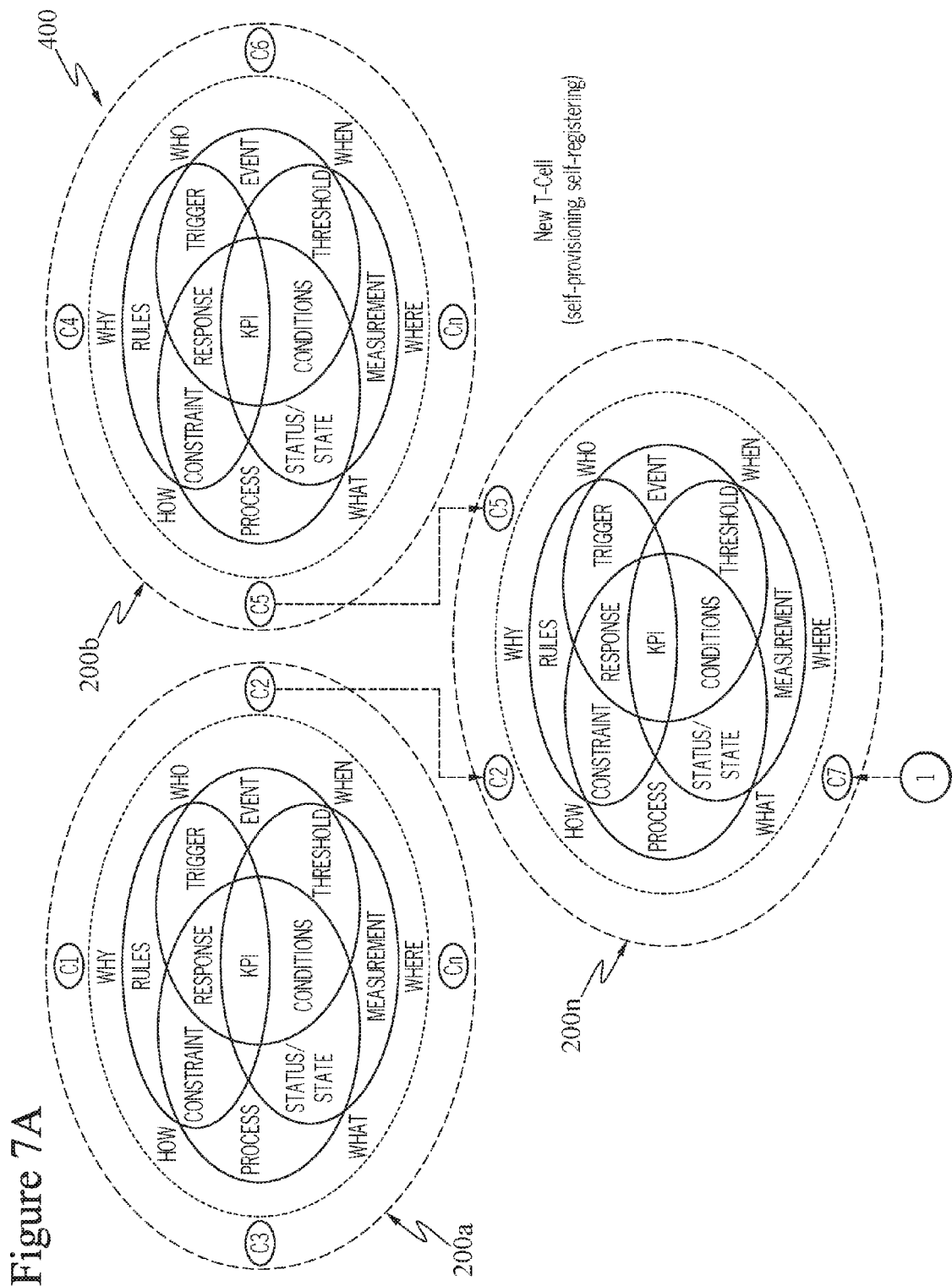
FIGS. 7A-B show an example environment in which a new T-CELL can be created according to embodiments of the invention.
Figure 7B:
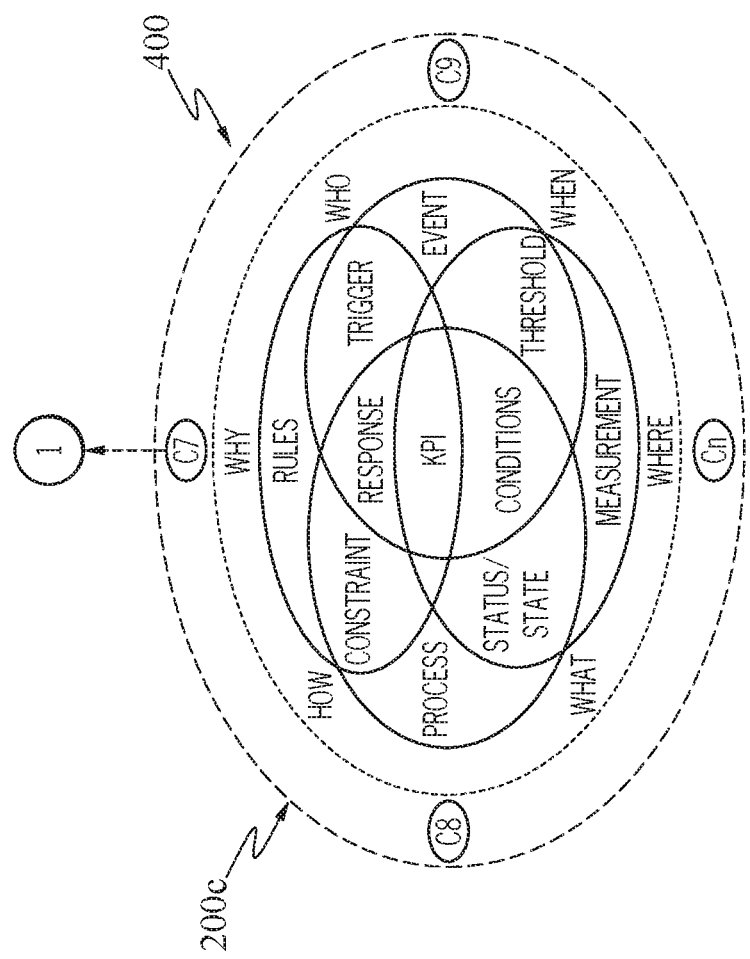

Referring now to FIG. 1 in conjunction with FIG. 5 and FIG. 7, computer system 102, executing T-CELL creation module 148, automatically creates a new T-CELL 200n to respond to the change. In order to be able to respond to the change, new T-CELL 200n includes any characteristics 150 that were identified as being necessary to bring about the desired outcome. These characteristics 150 can be incorporated into new T-CELL 200n using characteristics 150 from other T-CELLs 200a-c. For example, T-CELLs 200a-c having the characteristics 250 deemed necessary to create the new T-CELL 200 can be identified from mapping 152. To this extent, a unique T-CELL 150 can be identified as having each of the identified characteristics 250. Building blocks 210 that contribute the identified characteristics 250 can be retrieved from each of the identified T-CELLs 200a-c, and these building blocks can be assembled to form the new T-CELL 200n. New T-CELL 200n can then register itself in mapping 152 and/or can self-publish in mapping 152.

Referring now to FIG. 7, an example environment 400 in which a new T-CELL 200n can be created is shown according to embodiments of the invention. For example, as shown, characteristics 250 C2, C5, and C7 have been identified as being necessary to address the change. As illustrated, T-CELL 200a has been identified as having characteristic 250 C2. Similarly, T-CELL 200b has been identified as having characteristic 250 C5, and T-CELL 200c has been identified as having characteristic 250 C7. To this extent, these characteristics 250 (and their constituent building blocks 210 (FIG. 5)) have been assembled from T-CELLs 200a-c to create the new T-CELL 200n. To this extent, new T-CELL 200n can be created using individual portions of existing T-CELLs 200a-c without having to merge the entirety of the T-CELLs 200a-c into the new T-CELL 200n.

Figure 8:
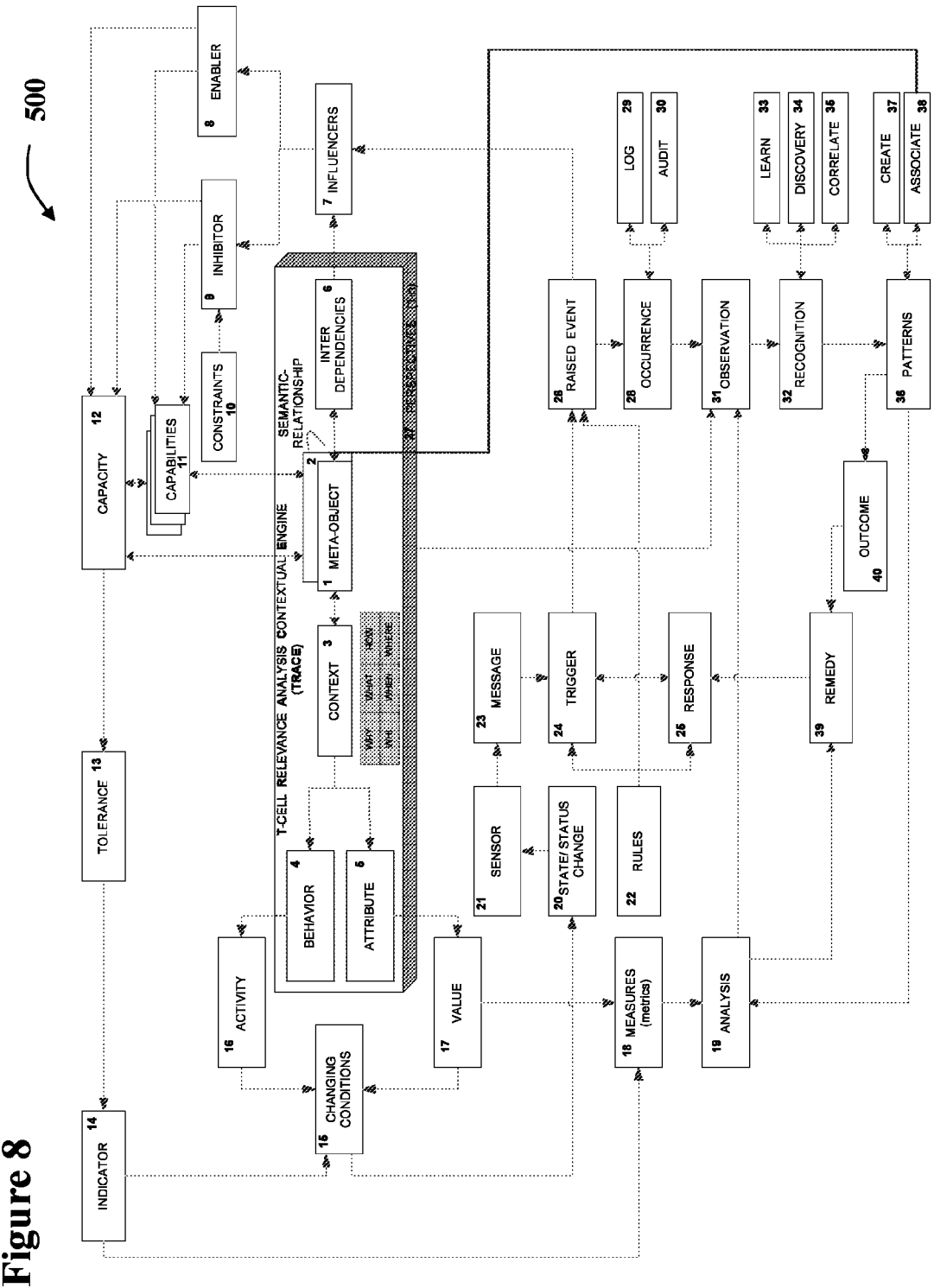
FIG. 8 shows an example logical framework for a set of T-CELL according to embodiments of the invention.

Referring now to FIG. 8, a logical framework 500 for a set of T-CELLs 200 (FIG. 5) is shown according to embodiments of the invention. Framework 500 can provide derived intelligence to drive the system within which T-CELLs 200 (FIG. 5) function. To accomplish this, framework 500 can provide functionality for governing the entity state of each T-CELL 200 (FIG. 5) in the system. Additionally, framework 500 can provide functionality for governing relationships between T-CELL 200 (FIG. 5) entities with the system. As such, framework 500 includes an internal assessment that evaluates the existing state and/or potential change state of each T-CELL 200 (FIG. 5) entity and the interrelationship between the T-CELL 200 (FIG. 5) entities. Based on this assessment framework is able to frame a capability-based remedy response that is based on desired outcomes.

Referring now to FIG. 6 and FIG. 1, concurrently, framework 300 can include one or more T-CELLs 300 (meta object) (1), which can include one or more capabilities (11), and which have context (3), behavior (4) and attributes (5) values (17). These can form a perspective (27), which can be observed (31). Each T-CELL 300 can also have semantic relationships (2) with other T-CELLs 300 through contextual relevant association or inheritance from or with other T-CELLs 300. This can be maintained through T-CELL Relevance Analysis Contextual Engine (TRACE) mapped interdependencies (6). The mapped interdependencies can create influencer (7) that can either act as enablers (8) or inhibitor (9) (such as constraint (10)) on the capacity (12) tolerances (13) of these capabilities. These tolerance (13) levels, which can be modified, are indicators (14) used in measures (metrics (18)) analysis (19) and indicate changing conditions (15) that drive change in state or status (20) of T-CELLs 300. Sensors (21) detect this change and send messages (23) which trigger (24) a response process (25) and raise an event (26) with associated rules (22) how to handle and respond to the event. The occurrence (28) of the event (26) can be logged (29) for audit (30) and observed (31) for recognition (32) by learning (33) through discovery (34) or correlation (35). This recognition (32) creates (37) and/or associates (37) patterns (36), which affect and/or define outcomes (40). These outcomes (40) are determinates of the remedy (39) used in the response process (25) which in turn can trigger (24) another raised event (26) and the cycle continues.

Figure 9:
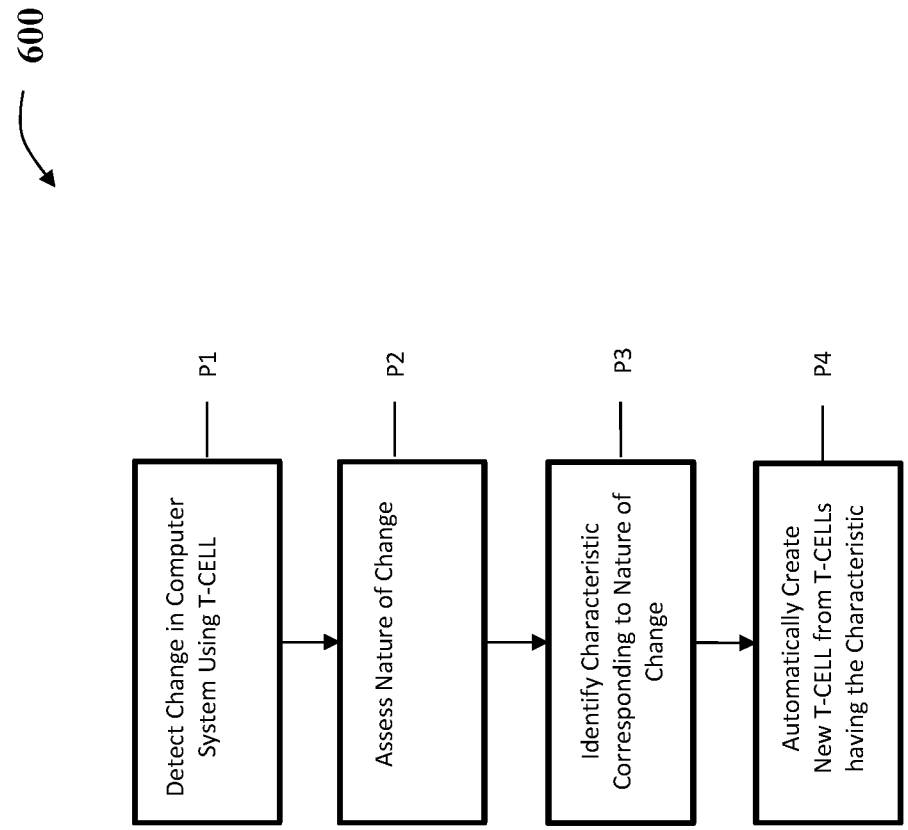
FIG. 9 shows an example flow diagram according to embodiments of the invention.

Referring now to FIG. 9, in conjunction with FIG. 1, an example flow diagram 600 according to embodiments of the invention is shown. As illustrated, in P1, change detection module 142, as executed by computer system 102, detects a change 310 (FIG. 6) in a computer system using T-CELL 200. In P2, change nature assessing module 144, as executed by computer system 102. assesses a nature of the change 310 (FIG. 6). In P3, characteristic identifying module 146, as executed by computer system 102, identifies a characteristic 150 (FIG. 5) corresponding to the nature of the change 310 (FIG. 6). In P4, T-CELL creation module 148, as executed by computer system 102, automatically creates a new T-CELL 200n (FIG. 7) from a plurality of T-CELLs 200a-c (FIG. 7) having the characteristics 250 (FIG. 7).

While shown and described herein as a method and system for responding to a change in an environment, it is understood that aspects of the invention further provide various alternative embodiments. For example, in one embodiment, the invention provides a computer program fixed in at least one computer-readable medium, which when executed, enables a computer system to respond to a change in an environment. To this extent, the computer-readable medium includes program code, such as change response program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as change response program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for responding to a change in an environment of a computer system In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another. The modifier "approximately", where used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for responding to a change in an environment of a computer system, comprising:
    detecting a change within the computer system with a set of triggered controlled event listener learners (T-CELLs), each T-CELL of the set of T-CELLs being a self-contained, persistent software construct that communicates with other T-CELLs in the computer system and including characteristics that define a problem set that can be solved by the T-CELL;
    assessing a nature of the change using the set of T-CELLs;
    identifying a characteristic having at least of portion of the nature of the change; and
    automatically creating a new T-CELL having the characteristic using the characteristics from a plurality of T-CELLS to respond to the change.

2. The method of claim 1, wherein each T-CELL further includes:
    a set of processes, a set of rules, a set of events, and a set of measurements that form building blocks of the T-CELL; and
    a set of contextual references that define a context in which the T-CELL functions.

3. The method of claim 2, wherein the nature of the change further comprises:
    what changed with regard to associated building blocks;
    an effect of the change on existing desired outcomes associated with the building blocks; and
    which meta-objects in a domain of the computer system are affected by the change to the building blocks.

4. The method of claim 3, wherein the identifying of the characteristic further comprises:
    determining which of the building blocks is necessary to achieve a desired outcome;
    determining which of the contextual references is necessary to achieve the desired outcome; and
    using the determined building blocks and contextual references to identify the characteristic.

5. The method of claim 1, wherein the creating further includes identifying a T-CELL having the characteristic from a mapping, the mapping containing, for each T-CELL, a registration of the T-CELL, characteristics of the T-CELL, and relationships of the T-CELL with other T-CELLs.

6. The method of claim 5, wherein the creating further includes:
    identifying a unique T-CELL having each of the identified characteristics;
    retrieving the building blocks that contribute to the identified characteristics from each identified unique T-CELL; and
    assembling the building blocks to form the new T-CELL.

7. The method of claim 6, wherein the creating further includes the new T-CELL registering itself in the mapping.

8. A system for responding to a change in an environment of a computer system, comprising:
    a memory medium comprising instructions;
    a bus coupled to the memory medium;
    a processor coupled to the bus; and
    a set of triggered controlled event listener learners (T-CELL), each T-CELL of the set of T-CELLS being a self-contained, persistent software construct that communicates with other T-CELLs in the computer system and having a set of the characteristics that define a problem set that can be solved by the T-CELL, wherein, in response to a detecting of a change in the computer system, the set of T-CELLs automatically create a new T-CELL to respond to the change.

9. The system of claim 8, wherein the creating of the new T-CELL further comprises:
    assessing a nature of the change using the set of T-CELLs;
    identifying a characteristic having at least of portion of the nature of the change; and
    automatically creating the new T-CELL having the characteristic using characteristics from a plurality of T-CELLS to respond to the change.

10. The method of claim 9,
    wherein each T-CELL further has: a set of processes, a set of rules, a set of events, and a set of measurements that form building blocks of the T-CELL; and
    wherein the nature of the change further comprises:
        what changed with regard to associated building blocks;
        an effect of the change on existing desired outcomes associated with the building blocks; and
        which meta-objects in a domain of the computer system are affected by the change to the building blocks.

11. The method of claim 10,
    wherein each T-CELL further has a set of contextual references that define a context in which the T-CELL functions; and
    wherein the identifying of the characteristic further comprises:

determining which of the building blocks is necessary to achieve a desired outcome;
determining which of the contextual references is necessary to achieve the desired outcome; and
using the determined building blocks and contextual references to identify the characteristic.

12. The method of claim 9, wherein the creating further includes identifying a T-CELL having the characteristic from a mapping, the mapping containing, for each T-CELL, a registration of the T-CELL, characteristics of the T-CELL, and relationships of the T-CELL with other T-CELLs.

13. The method of claim 12, wherein the creating further includes:
identifying a unique T-CELL having each of the identified characteristics;
retrieving the building blocks that contribute to the identified characteristics from each identified unique T-CELL; and
assembling the building blocks to form the new T-CELL.

14. The method of claim 13, wherein the creating further includes the new T-CELL registering itself in the mapping.

15. A computer program product embodied in a computer readable medium that is not a signal for responding to a change in an environment of a computer system, comprising:
a set of trigger controlled event listener learners (T-CELLs), each T-CELL of the set of T-CELLS being a self-contained, persistent software construct that communicates with other T-CELLs in the computer system and having a set of the characteristics that define a problem set that can be solved by the T-CELL.

16. The program product of claim 15, wherein the creating of the new T-CELL further comprises:
assessing a nature of the change using the set of T-CELLs;
identifying a characteristic having at least a portion of the nature of the change; and
automatically creating the new T-CELL having the characteristic using characteristics from a plurality of T-CELLS to respond to the change.

17. The program product of claim 16,
wherein each T-CELL further has: a set of processes, a set of rules, a set of events, and a set of measurements that form building blocks of the T-CELL; and
wherein the nature of the change further comprises:
what changed with regard to associated building blocks;
an effect of the change on existing desired outcomes associated with the building blocks; and
which meta-objects in a domain of the computer system are affected by the change to the building blocks.

18. The program product of claim 17,
wherein each T-CELL further has a set of contextual references that define a context in which the T-CELL functions; and
wherein the identifying of the characteristics further comprises:
determining which of the building blocks is necessary to achieve a desired outcome;
determining which of the contextual references is necessary to achieve the desired outcome; and
using the determined building blocks and contextual references to identify the characteristics.

19. The program product of claim 16, wherein the creating further includes identifying a T-CELL having the characteristic from a mapping, the mapping containing, for each T-CELL, a registration of the T-CELL, characteristics of the T-CELL, and relationships of the T-CELL with other T-CELLs.

20. The program product of claim 19, wherein the creating further includes:
identifying a unique T-CELL having each of the identified characteristics;
retrieving the building blocks that contribute to the identified characteristics from each identified unique T-CELL; and
assembling the building blocks to form the new T-CELL.

* * * * *